United States Patent [19]

Okumura

[11] Patent Number: 4,823,885

[45] Date of Patent: Apr. 25, 1989

[54] TORQUE ADJUSTING DEVICE FOR POWER DRIVEN ROTARY TOOLS

[75] Inventor: Michio Okumura, Anjo, Japan

[73] Assignee: Makita Electric Works, Ltd., Anjo, Japan

[21] Appl. No.: 81,694

[22] Filed: Aug. 5, 1987

[30] Foreign Application Priority Data

Aug. 8, 1986 [JP] Japan .............. 61-122237[U]

[51] Int. Cl.⁴ .............................................. B25B 23/14
[52] U.S. Cl. .................................... 173/12; 173/163; 464/39; 81/473
[58] Field of Search .......................... 173/12, 48, 163; 81/473–476, 467; 192/56 R; 464/36–39

[56] References Cited

U.S. PATENT DOCUMENTS 2,857,997 10/1958 Graybill .............................. 464/39
3,809,168 5/1974 Fromm ................................ 173/48

Primary Examiner—Douglas D. Watts
Assistant Examiner—James L. Wolfe
Attorney, Agent, or Firm—Dennison, Meserole, Pollack & Scheiner

[57] ABSTRACT

A power driven rotary tool includes a housing and an electric motor mounted within the housing. A transmission shaft is rotatably supported by the housing, and a drive gear is idly supported by the transmission shaft and is operatively connected to the electric motor. A clutch is provided being engageable with the drive gear, and is rotatably and axially movably supported by the transmission shaft. A slider is axially movably fitted on the transmission shaft, and a spring is operatively connected to the slider for urging the clutch toward the drive gear. A manually-rotatable selector ring is provided and is attached to the housing. The slector ring includes a cam face curved along the peripheral edge thereof and having a plurality of steps formed in a direction axially of the transmission shaft so as to displace the slider by stages in the axial direction for adjusting the amount of compression of the spring.

4 Claims, 5 Drawing Sheets

TORQUE ADJUSTING DEVICE FOR POWER DRIVEN ROTARY TOOLS

BACKGROUND OF THE INVENTION

1. Field of the Invention

The present invention relates to power driven rotary tools such as screwdrivers and drills, and more particularly to such tools having a torque adjusting device which is adapted to adjust the torque for driving a tool bit for rotation.

2. Description of the Prior Art

In general, power driven rotary tools, such as screwdrivers, have a torque adjusting device wherein optimum tightening torque may be selected at will to suit the size of the screw and the nature of the work so as to prevent improper tightening such as insufficient tightening and excessive tightening.

Such a torque adjusting device is disclosed, for example, in U.S. Pat. Nos. 3,001,430, 3,442,360 and 4,265,320. The disclosed device includes a clutch interposed between an electric motor and a tool bit, a coil spring for biasing the clutch in one direction, and a ring-shaped adjusting member adapted to act on the spring. The adjusting member threadably engages the housing of the tool so that when the operator rotates adjusting member, it increases or decreases the spring force to be applied to the clutch. Thus, the device includes an adjusting member threadably engaging the housing and hence, it has the disadvantage that the operator must rotate the adjusting member through a large angle, resulting in a poor efficiency of torque adjusting operation. Further, there is the disadvantage that the device is complicated in construction and cumbersome to use.

In some designs, a power driven rotary tool may include a control member located on the underside of the tool body. For example, Japanese Laid-Open Utility Model Publication No. 59-143670 discloses a screwdriver including a torque adjusting lever for adjusting the biasing force of a coil spring which bears against a clutch, and U.S. Pat. No. 4,161,242 discloses a driver drill having an adjusting lever for shifting the tool between driver mode and drill mode. However, because of the control member provided on the underside of the tool body, these cited tools have the disadvantage that the adjusting operation is cumbersome. Further, there is the disadvantage that the torque setting or the shifting between driver mode and drill mode can not be verified during operation, resulting in reduced ease of operation.

SUMMARY OF THE INVENTION

It is, accordingly, an object of the present invention to provide a power driven rotary tool which is capable of reliably adjusting the torque force for driving a tool bit.

It is another object of the present invention to provide a power driven rotary tool including a torque adjusting mechanism which is simple in construction and easy to use.

It is a further object of the present invention to provide a power driven rotary tool which enables the operator to verify the torque setting even in operation.

The power driven rotary tool includes, according to the present invention, a housing and an electric motor mounted within the housing. A transmission shaft is rotatably supported by the housing, and a drive gear is idly supported by the transmission shaft and is operatively connected to the electric motor. A clutch is provided being engageable with the drive gear, and is rotatably and axially movably supported by the transmission shaft. A slider is axially movably fitted on the transmission shaft, and a spring is operatively connected to the slider for urging the clutch toward the drive gear. A manually-rotatable selector ring is provided and is attached to the housing. The selector ring includes a cam face curved along the peripheral edge thereof and having a plurality of steps formed in a direction axially of the transmission shaft so as to displace the slider by stages in the axial direction for adjusting the amount of compression of the spring. The present invention will become more fully apparent from the claim and the description as it proceeds in connection with the drawings.

DETAILED DESCRIPTION OF THE PREFERRED EMBODIMENT

Figure 1:
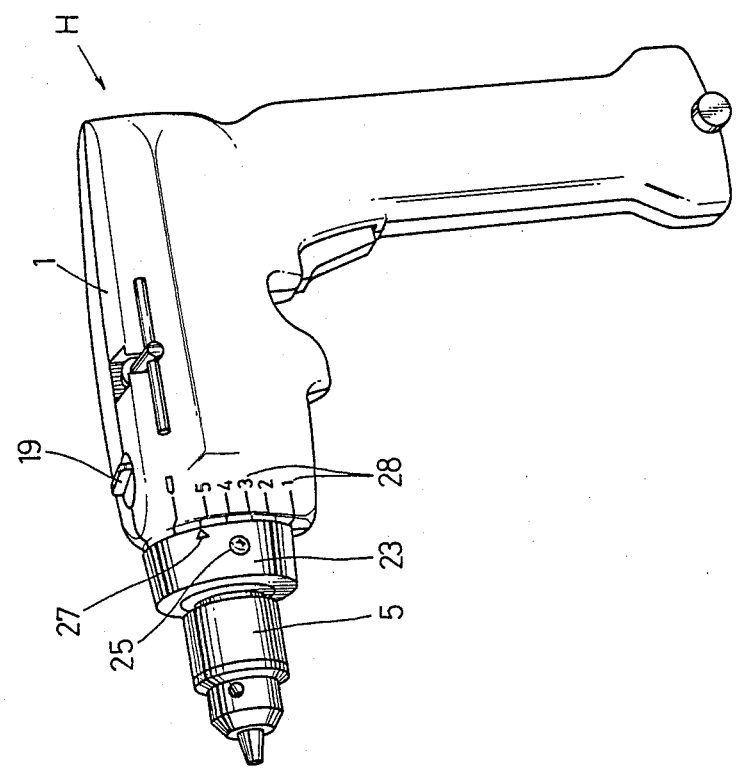
FIG. 1 is a perspective view of a driver drill embodying the present invention.
Figure 2:
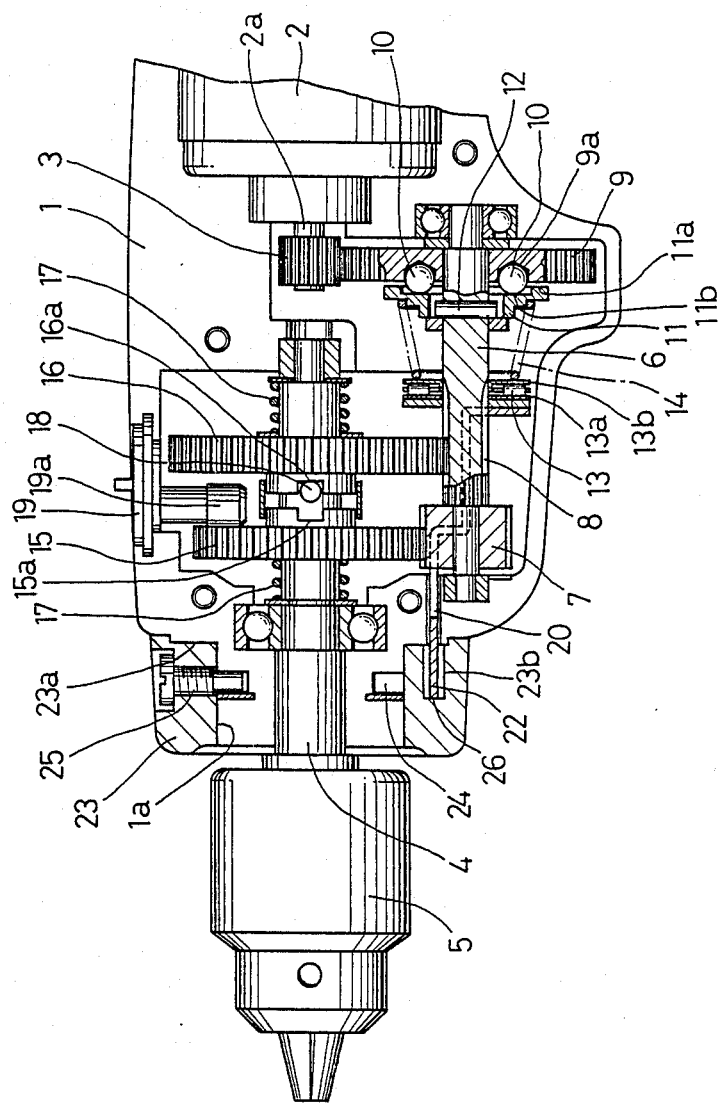
FIG. 2 is a side sectional view of the essential parts of the driver drill, illustrating the slider positioned for operation of the tool in the driver mode.
Figure 3:
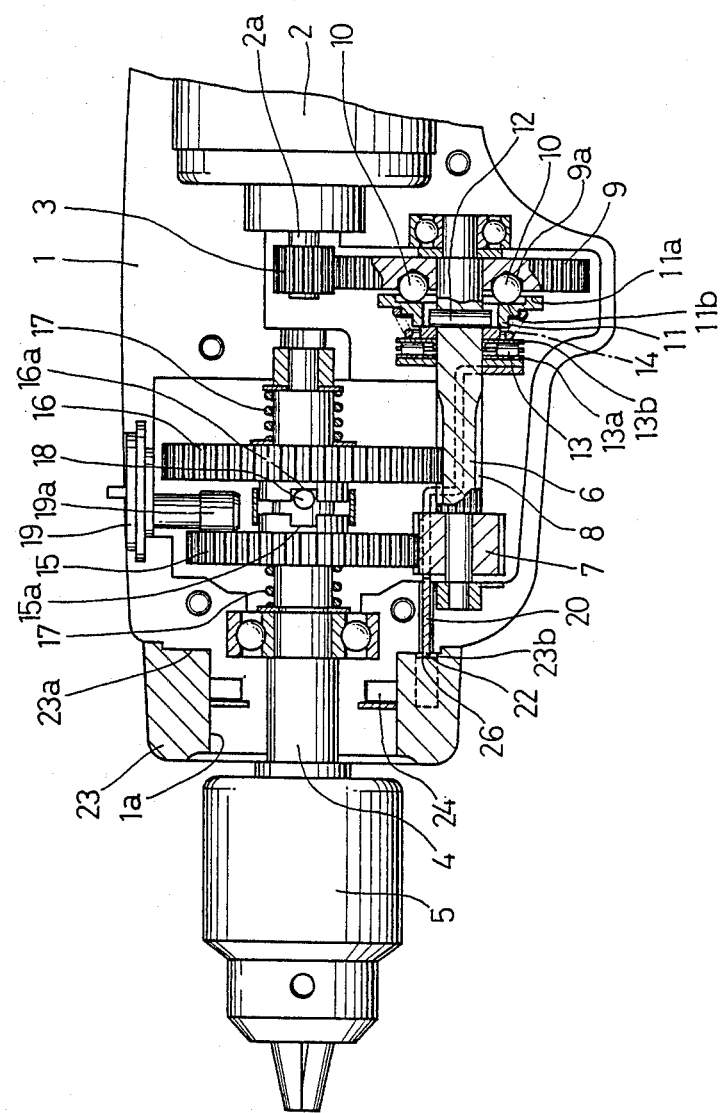
FIG. 3 is a view similar to FIG. 2, illustrating the slider in a fully retracted position for operation of the tool in the drill mode.

Referring to FIGS. 1 to 3 in general, shown therein is a driver drill H embodying the principles of the present invention. As shown therein, the driver drill H comprises a split housing 1 having a pair of complementary mating halves which are detachably secured along a common longitudinal midplane. An electric motor 2 is supported in the rear region of the housing 1 and has a shaft 2a extending forwardly therefrom, the shaft 2a having a pinion 3 secured thereto. The driver drill H includes a spindle 4 extending horizontally in the front region of the housing 1 and having fixed thereto a chuck 5 for holding a tool bit (not shown).

A transmission shaft 6 is rotatably supported within the housing 1 and extends below and parallel to the spindle 4. The transmission shaft 6 has a front intermediate gear 7 fitted on its front end and a rear intermediate gear 8 formed on its medial portion. The front intermediate gear 7 is larger in diameter than the rear intermediate gear 8 and connected in a stepped manner to the front end of the rear intermediate gear 8.

The transmission shaft 6 also has a drive gear 9 idly fitted on its rear end and engaged by the motor pinion 3. The drive gear 9 has four radial fitting holes 9a (only two is seen in FIG. 2) peripherally spaced at an angle of 90 degrees. A spherical engaging member 10 is seated in each fitting hole 9a with its peripheral surface extending beyond the face of the drive gear 9.

A clutch 11 is disposed in generally confronting relation to the drive gear 9 and is rotatably and axially movably supported by the transmission shaft 6 through a pin 12 extending through the transmission shaft 6. The clutch 11 is formed on the rear end surface thereof with a clutch surface 11a having four radial recesses 11b peripherally spaced at an angle of 90 degrees and adapted to engage the engaging members 10 to transmit rotation of the drive gear 9 to the transmission shaft 6.

A needle bearing 13 is axially movably carried by the transmission shaft 6 having a pair of front and rear discs 13a and 13b. A coil spring 14 is positioned between the clutch 11 and the rear disc 13b and is compressible to set the torque limits for rotating the transmission shaft 6. Specifically, the spring 14 serves to urge the clutch 11 toward the drive gear 9 and thereby to bring the clutch 11 into resilient engagement with the engaging members 10. Thus, when the load transmitted to the transmission shaft 6 falls below the torque limit set by the spring 14, the engagement between the clutch 11 and the engaging members 10 is maintained to permit the rotation of the drive gear 9 to be transmitted to the transmission shaft 6. Conversely, when the load transmitted to the transmission shaft 6 exceeds the torque limit, the clutch 11 is repeatedly reciprocated into and out of engagement with the engaging members 10, causing the drive gear 9 to rotate idly relative to the clutch 11.

A pair of front and rear driven gears 15 and 16 are provided to vary the rotational speed of the spindle 4 in two steps, high speed and low speed. The driven gears 15 and 16 are axially slidably mounted on the spindle 4 and are urged by springs 17 toward one another. The front driven gear 15 is engaged by the front intermediate gear 7 and has a front engaging groove 15a engageable with a lock pin 18 extending through the spindle 4. The rear driven gear 16 is engaged by the rear intermediate gear 8 and has a rear engaging groove 16a engageable with the lock pin 18. A manually-operable shifter 19 is provided to axially move both the driven gears 15 and 16, and is disposed on the front upper surface of the housing 1. The shifter 19 has a pushing member 19a fixed eccentrically to the lower end portion thereof and extending between the driven gears 15 and 16. Thus, when the shifter 19 is rotated to move the front driven gear 15 forwardly against the biasing force of the spring 17, as shown in FIG. 2, the lock pin 18 is engaged by the rear engaging groove 16a of the rear driven gear 16, so that the spindle 4 is rotated at low speed imparted by the rear driven gear 16. Conversely, when the shifter 19 is rotated to move the rear driven gear 16 rearwardly against the biasing force of the spring 17, the lock pin 18 is engaged by the front engaging groove 15a of the front driven gear 15, so that the spindle 4 is rotated at high speed imparted by the front driven gear 15.

Figure 4:
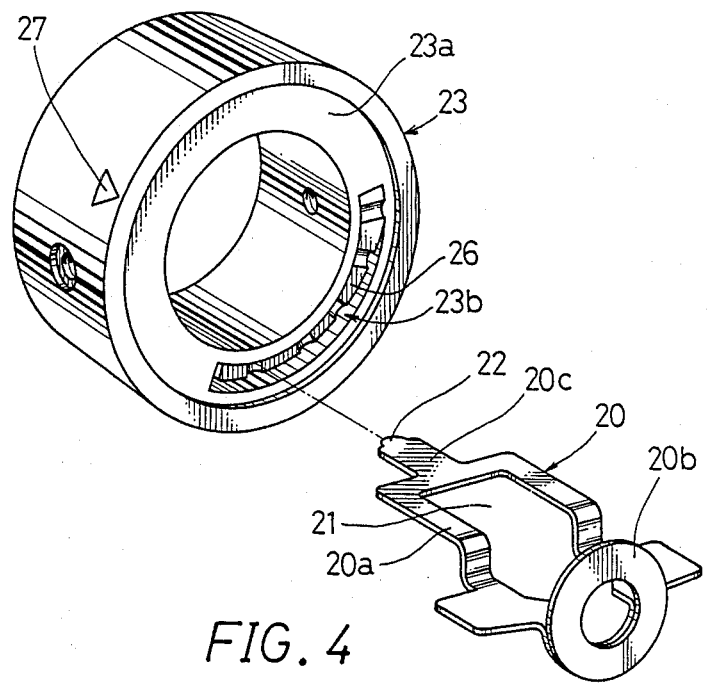
FIG. 4 is an exploded perspective view of the selector ring and the slider.

A slider 20 is provided in the front lower region of the housing 1 and is axially slidably mounted on the transmission shaft 6. Specifically, as shown in FIG. 4, the slider 20 has a stepped base portion 20a having an aperture 21 through which the front and rear intermediate gears 7 and 8 extend. The slider 20 also has a ring-shaped pushplate 20b connected to the rear end thereof and a horizontal sliding portion 20c formed at the front end thereof. The pushplate 20b is slidably fitted on the transmission shaft 6 and is adapted to bear against the front disc 13a of the needle bearing 13 to compress the spring 14. The horizontal sliding portion 20c is adapted to extend through the front end wall of the housing 1 and is formed at its front end with a substantially semi-circular engaging projection 22.

Figure 5:
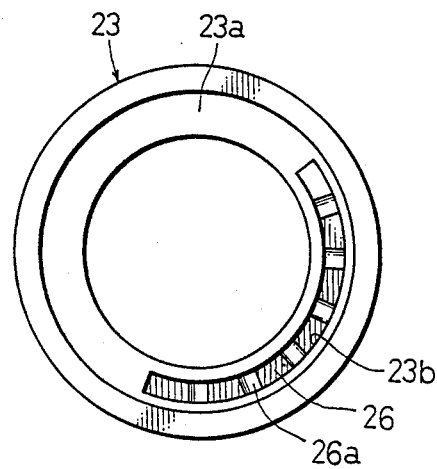
FIG. 5 is a rear view of the selector ring.
Figure 6:
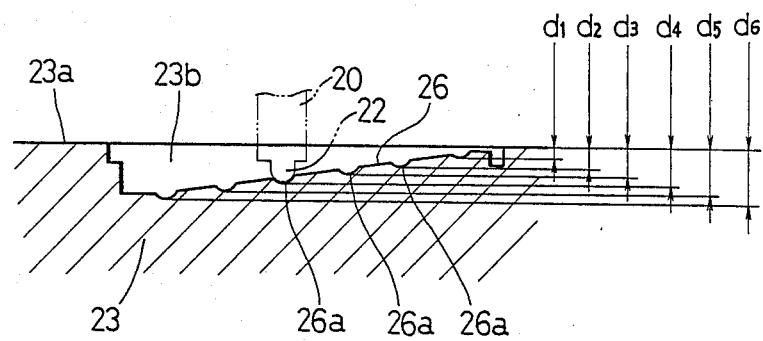
FIG. 6 is a developed view of the cam face.

A manually-rotatable selector ring 23 is provided to urge the slider 20 in a direction axially of the transmission shaft 6 and is fitted on a stepped portion 1a formed at the front end of the housing 1. The selector ring 23 is disposed coaxially with the spindle 4 and is adapted to be rotated about a longitudinal axis of the spindle 4. A step bolt 25 is threadably attached to the selector ring 23, with its distal end inserted in a guide groove 24 formed peripherally in the outer surface of the stepped portion 1a. As best shown in FIGS. 4 and 5, the selector ring 23 has a rear end surface 23a which in turn has an arcuate cam groove 23b formed along the peripheral edge thereof. The cam groove 23b includes on the bottom surface thereof an inclined cam face 26 having a plurality of steps formed in a direction axially of the transmission shaft 6. With this arrangement, the engaging projection 22 of the slider 20, which is resiliently held between the selector ring 23 and the spring 14, can be moved into contact with the cam face 26 to displace the slider 20 in a stepped manner in the axial direction of the transmission shaft 6 and thereby to adjust the amount of compression of the spring 14. The cam face 26 has a plurality of concave engaging recesses 26a adapted to engage the engaging projection 22 of the slider 2 for positioning the slider 20. As shown in FIG. 6, the engaging recesses 26a are so arranged as to equidistantly increase their distances $d_1$ to $d_6$ from a reference surface which is the rear end surface 23a of the selector ring 23. Thus, when the selector ring 23 is manipulated for rotation, the cam face 26 turns about the spindle axis to move the slider 20 therealong, so that the slider 20 is displaced in the axial direction of the transmission shaft 6 to increase or decrease the amount of compression of the spring 14 and thereby to adjust the torque limit of the transmission shaft 6 and the spindle 4.

The selector ring 23 has on the outer periphery thereof a pointer 27 which cooperates with indicia markings 28 formed peripherally about the front end of the housing 1. The indicia markings 28 indicate the turning angle of the selector ring 23 which is representative of the respective engaging recesses 26a of the cam face 26.

Figure 7:
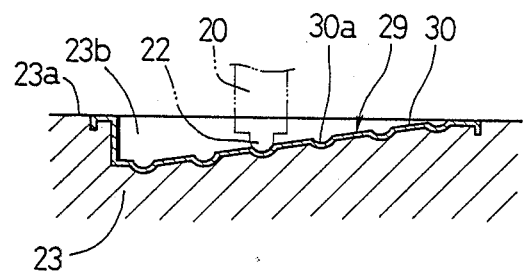
FIG. 7 is a view similar to FIG. 6, illustrating a variant form of the cam face.

It will be appreciated that modifications may be made in the present invention. For example, as shown in FIG. 7, the bottom surface of the cam groove 23b of the change ring 23 may be lined with a contact strip 29 of sheet metal bent along its length to form a cam face 30 with engaging recesses 30a.

The operation of the tool thus constructed will now be described with reference to FIGS. 2 and 3.

Upon starting rotation of the electric motor 2, the drive gear 9 is rotated through the motor pinion 3, and the rotation of the drive gear 9 is transmitted to the transmission shaft 6 through the engaging members 10 engaged by the recesses 11b of the clutch 11 under the biasing force of the spring 14. The spindle 4 is then rotated through the front driven gear 15 or the rear driven gear 16 selected by the shifter 19. When the spindle 3 is overloaded, the rotational force of the drive gear 9 imparted by the electric motor 2 causes the engaging members 10 to axially urge the clutch 11 against the biasing force of the spring 14. Thus, only the drive gear 9 is rotated, cutting off the rotational force to be transmitted to the clutch 11. In the driver mode shown in FIG. 2, the tightening torque is adjusted by rotating the selector ring 23 to displace the slider 20. When the selector ring 23 is rotated, the cam face 26a tends to displace the slider 20 in the axial direction of the transmission shaft 6, thereby varying the amount of compression of the spring 14.

When it is desired to shift the tool from driver mode to drill mode, the operator rotates the selector ring 23 to cause the slider 20 to be moved axially so as to limit the axial movement of the clutch 11. Specifically, in the drill mode shown in FIG. 3, the engaging projection 22 of the slider 20 is placed on the engaging recess 26a at the minimum height (distance $d_1$ of FIG. 6) from the reference surface, and the slider 20 has been displaced axially toward the clutch 11. Thus, the spring 14 is in full compression and the clutch 11 is in firm engagement with the engaging members 10 of the drive gear 9. The tool is shifted to the drill mode in which torque adjusting operation can not be performed.

From the foregoing description, it can be seen that the torque limits of the transmission shaft 6 and the spindle 4 can be varied both properly and easily. Thus, the operation of adjusting the torque limits may be advantageously simplified.

Especially, as the selector ring 23 is fitted on the front end of the housing 1, the selector ring 23 is easily accessible and the torque setting may be visually inspected during operation, thereby improving the efficiency of operation.

Furthermore, according to the present invention, the amount of compression of the spring 14 is adjustable in multiple steps to vary the torque limit of the spindle 4, and the spindle 4 can be rotated at two different speeds. Thus, the various combinations of torque limits and rotational speeds of the spindle 4 permit wider application of the tool.

While the invention has been described with reference to a preferred embodiment thereof, it is to be understood that modifications or variations may be easily made without departing from the scope of the present invention which is defined by the appended claim.

What is claimed is:

1. A power driven rotary tool comprising:
   a housing including front and rear ends;
   an electric motor mounted within said housing adjacent the rear end thereof;
   a transmission shaft rotatably supported by said housing;
   a drive gear idly supported by said transmission shaft and operatively connected to said electric motor;
   a spindle rotatably mounted in said housing and including a portion extending through the front end of said housing;
   a plurality of speed change gears mounted on said spindle for selective driving engagement therewith;
   clutch means operably positioned on said transmission shaft and in generally confronting relation with said drive gear and between said drive gear and said speed change gears to selectively interconnect said drive gear and the selected speed change gear;
   a slider including front and rear ends axially movably fitted on said transmission shaft;
   a spring positioned between said slider and said clutch and adapted to urge said clutch toward said drive gear; and
   a manually-rotatable selector ring attached to the front end of said housing, said selector ring including a cam face positioned along a peripheral edge thereof and having a plurality of steps formed in a direction axially of said transmission shaft and engageable with said slider to selectively displace said slider in said axial direction for adjusting the axial position of said slider relative to said transmission shaft and amount of compression of said spring.

2. The power driven rotary tool as defined in claim 1 wherein said slider has an aperture formed intermediate the ends thereof through which said transmission shaft is inserted, an engaging projection formed at the front end of that slider and engageable with selected portions of said cam face of said selector ring, and a pushplate secured to the rear end of said slider and adapted to compress said spring toward said clutch.

3. The power driven rotary tool as defined in claim 1 wherein said cam face of said selector ring has formed thereon a plurality of engaging recesses for positioning said engaging projection of said slider.

4. The power driven rotary tool as defined in claim 1 wherein said selector ring further includes a contact strip of sheet metal attached to and extending along said cam face.

* * * * *